United States Patent [19]

Müller et al.

[11] Patent Number: 4,566,267
[45] Date of Patent: Jan. 28, 1986

[54] POWER GENERATING PLANT WITH AN INTEGRATED COAL GASIFICATION PLANT

[75] Inventors: Rainer Müller, Erlangen; Ulrich Schiffers, Eckental, both of Fed. Rep. of Germany

[73] Assignee: Kraftwerk Union Aktiengesellschaft, Mülheim, Fed. Rep. of Germany

[21] Appl. No.: 614,330

[22] Filed: May 25, 1984

[30] Foreign Application Priority Data

Jun. 3, 1983 [DE] Fed. Rep. of Germany ....... 3320228

[51] Int. Cl.[4] .............................................. F02C 3/28
[52] U.S. Cl. .................................. 60/39.07; 60/39.12
[58] Field of Search ............... 60/39.07, 39.12, 39.465, 60/39.182; 423/237, 238, 239

[56] References Cited

U.S. PATENT DOCUMENTS

| | | | |
|---|---|---|---|
| 1,739,217 | 12/1929 | Dely | 423/359 |
| 3,183,666 | 5/1965 | Jackson | |
| 3,868,817 | 3/1975 | Marion et al. | |
| 3,872,025 | 3/1975 | Singleton | 423/359 |
| 4,197,281 | 4/1980 | Muenger et al. | 423/359 |
| 4,315,900 | 2/1982 | Nozawa et al. | 423/359 |
| 4,347,064 | 8/1982 | Hirsch et al. | 48/197 R |
| 4,409,196 | 10/1983 | Skinner et al. | 252/373 |

FOREIGN PATENT DOCUMENTS

| | | |
|---|---|---|
| 0038138 | 10/1981 | European Pat. Off. |
| 0047596 | 3/1982 | European Pat. Off. |
| 2807326 | 8/1979 | Fed. Rep. of Germany |
| 3100751 | 1/1982 | Fed. Rep. of Germany |
| 1167493 | 10/1969 | United Kingdom |
| 2075124 | 11/1981 | United Kingdom |

OTHER PUBLICATIONS

ASME Paper, Title: Novel Gas Turbine Cycles with Coal Gasification, by S. Hamilton and S. J. Lehman.
Article from Dec. 1979 Combustion—Title: The Integration of Gasification with Combined Cycle Power Plants, by R. W. Foster-Pegg, Westinghouse Electric Corp.

*Primary Examiner*—Louis J. Casaregola
*Attorney, Agent, or Firm*—Herbert L. Lerner; Laurence A. Greenberg

[57] ABSTRACT

Power generating station with an integrated coal gasification plant, with an air separation plant, a coal gasifier and a heat exchanger and dust removal plant connected to the coal gasifier, as well as with a gas turbine and steam power generating part connected to the heat exchanger and dust removal plant part. An ammonia synthesis plant is connected to the coal gasification plant with the interposition of a gas purification plant and a gas decomposition plant. Part of the exhaust gas produced in the ammonia synthesis can be fed as so-called purge gas to the combustion chamber of the gas turbine together with the gases separated in the gas purification plant and in the gas separation plant, and part of the dust-free raw gas of the coal gasifier.

4 Claims, 1 Drawing Figure

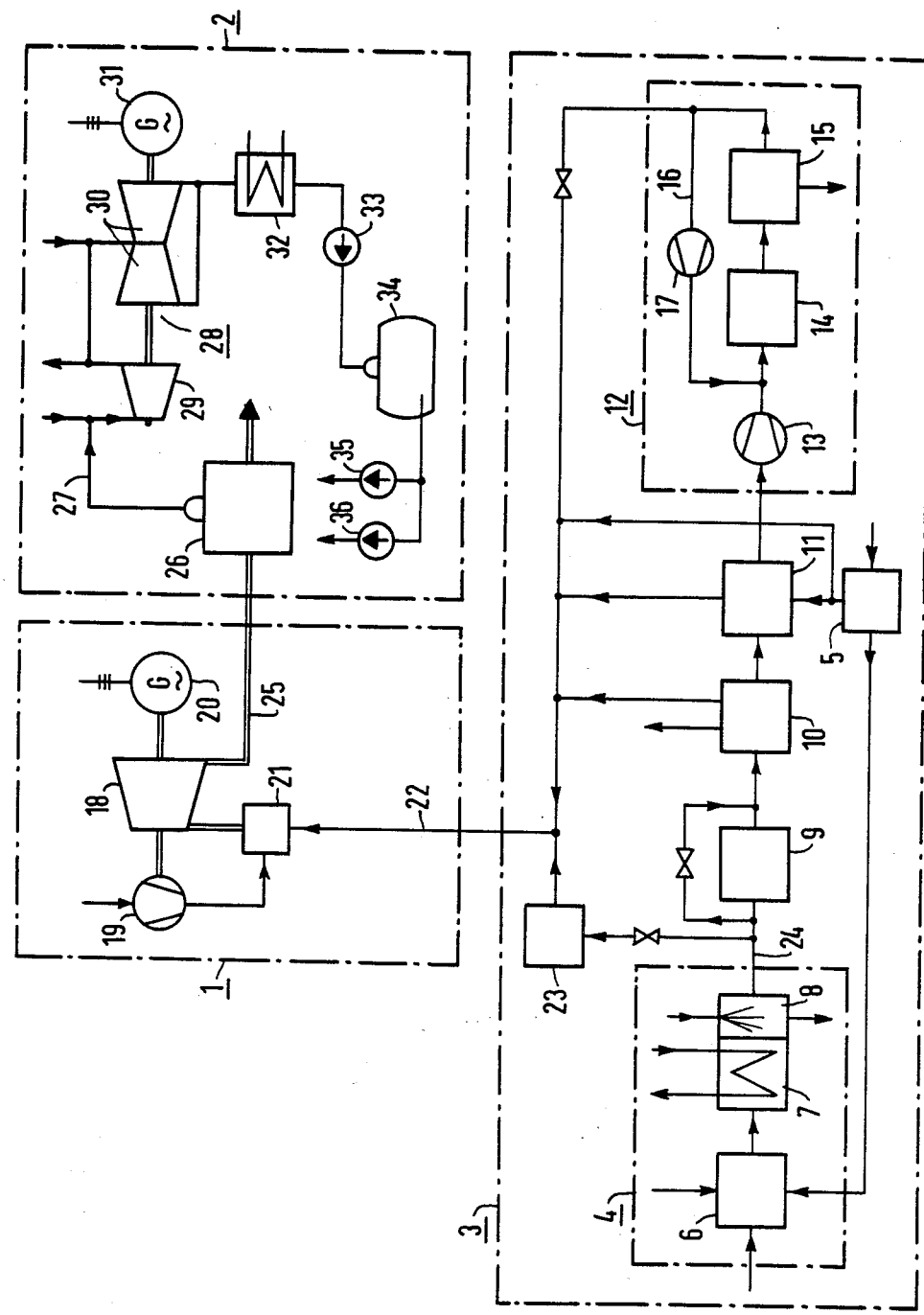

POWER GENERATING PLANT WITH AN INTEGRATED COAL GASIFICATION PLANT

BACKGROUND OF THE INVENTION

1. Field of the Invention

The invention relates to a power generating station with an integrated coal gasification plant, with an air separation plant, a coal gasifier and a heat exchanger and a gas dust removal installation connected to the coal gasifier, as well as with a gas turbine and steam power generating plant part connected to the heat exchanger and gas dust removal installation.

2. Description of the Prior Art

British Provisional Patent No. 20 75 124 discloses a power generating station in which a gas turbine is supplied with synthesis gas containing carbon monoxide and hydrogen from a coal gasification plant. The gas turbine drives an electric generator. The hot exhaust gases of the gas turbine are utilized in this power generating station for generating steam. A steam turbine and a further electric generator are driven with the steam. Part of the synthesis gas is fed in this power generating station to a methanol synthesis plant. The methanol produced is stored and burned for equalizing load peaks, in addition to the mixed gas. This power generating plant permits increased production of methanol during times of low load and sale of the methanol so produced as a chemical raw material to the extent it is not needed for equalizing peak loads. Apart from the fact that if load peaks are equalized frequently, only a small part of the methanol produced is freely available, the production costs for the methanol are not substantially below those of corresponding production methods which are independent of the power station.

SUMMARY OF THE INVENTION

An object of the present invention is to improve the efficiency of such a power generating station and to produce in the process chemical raw materials at low cost.

With the foregoing and other objects in view, there is provided in accordance with the invention a power generating station with an integrated coal gasification plant and an ammonia synthesis plant comprising:

(a) a coal gasification plant which includes a gasifier for gasification of coal to produce raw fuel gas containing a mixture of gaseous constituents including $H_2$, CO, $CO_2$ and $H_2S$, a heat exchanger in which the heat of the raw gas from the gasifier is utilized to generate steam, and a dust removal plant wherein the raw gas is treated to remove dust particles from the raw gas, (b) a gas turbine power plant which include a gas turbine, a combustion chamber of the gas turbine, an air compressor for introduction of air into the combustion chamber, and a generator coupled to the turbine, (c) a steam generating station which includes a steam generator, and a high pressure and low pressure steam turbine, (d) conduit means for the passage of steam from the heat exchanger of the coal gasification plant to the steam turbine, and connecting means for passage of part of the raw gas from the dust removal plant to the combustion chamber of the gas turbine, (e) an ammonia synthesis plant for the conversion into ammonia of synthesis gas containing hydrogen and nitrogen, having an ammonia synthesis reactor and separating means for separating ammonia from the residual gases in the reaction products from the synthesis reactor, connecting means to the ammonia synthesis plant from the dust removal plant for the utilization of raw gas therefrom to produce synthesis gas containing hydrogen and nitrogen suitable for conversion into ammonia, a gas purificaion plant interposed in said connecting means to remove impurities from the raw gas, a gas separation plant wherein the gas from the gas purification plant is treated to form synthesis gas suitable for conversion into ammonia and a separated fraction or residual gases, connecting means for conducting said synthesis gas into the ammonia synthesis reactor, conduit means for passage of part of the residual gases in the reaction products from the ammonia synthesis reactor together with the separated fraction of residual gases in the gas purification plant and gas from the dust removal plant to the combustion chamber of the gas turbine.

Other features which are considered as characteristic for the invention are set forth in the appended claims.

Although the invention is illustrated and described herein as embodied in a power generating plant with an integrated coal gasification plant, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates a power generating station with an integrated coal gasification plant and an ammonia synthesis plant in which not only is heat extracted from the raw gas from the coal gasifier and utilized to generate steam which is used in the steam turbine of the steam power generating plant but a substantial portion of the raw gas after treatment is converted to ammonia in an ammonia synthesis plant. The exhaust gas or residual gas from the ammonia synthesis plant together with the exhaust gases from the treatment of the raw gas, as well as part of the raw gas, is sent to the combustion chamber of the gas turbine.

DETAILED DESCRIPTION OF THE INVENTION

In a power generating station of the type mentioned at the outset, an ammonia synthesis plant is connected, according to the invention, to the coal gasification plant with the interposition of a gas purification plant and a gas separation plant. Part of the exhaust gas produced in the ammonia synthesis can be fed as a so-called purge gas together with the gases separated in the gas purification plant and the gas separation plant and part of the dust-free raw gas of the coal gasifier to the combustion chamber of the gas turbine power generating plant part. Thus, the separate generation of process steam and electric power in a conventional power generating station and in a chemical plant are avoided and the coal gasifier may be operated in an economical range even during times of low load. Finally, the chemical and thermal energies of the residual gases from the various reaction stages are utilized in the gas turbine in a thermo-dynamically advantageous manner.

Further details of the invention will be explained with the aid of an embodiment example shown in the drawing.

The schematic presentation in the drawing makes it clear that the power generating station consists of a gas turbine power generating plant part 1, a steam power generating station part 2 and an installation 3 for producing chemical raw materials. The installation 3 for the production of chemical raw materials contains a coal gasification plant 4 which includes an air separation plant 5 for the separation of air into oxygen and nitrogen, a heat exchanger installation 7 connected to the coal gasifier 6 for the extraction of heat from raw gas from the gasifier and utilization of the heat to generate steam and a gas dust collector 8 for the removal of dust particles from the raw gas. Part of the plant for producing chemical raw materials are a converting plant 9, a gas purification plant 10 and a gas separation plant 11, to which a plant 12 for the ammonia synthesis is connected. The latter contains a gas compressor 13, an ammonia synthesis reactor 14, an ammonia cooler and gas separator 15 as well as a recirculating line 16 for returning unreacted synthesis exhaust gases to reactor 14 by means of compressor 17.

In the gas turbine power generating station part 1 is shown a gas turbine 18, which drives a compressor 19 and a generator 20. The gas turbine 18 precedes a combustion chamber 21 which is supplied, via a combustion gas line 22, from the plant 4 for generating chemical raw materials with combustible gas and with air from the compressor 19. In the embodiment example, the fuel gas line 22 is connected, via a gas scrubber 23 to remove impurities, to the raw gas line 24 connecting the coal gasifier 4 to the converting plant 9, as well as to the nitrogen line leading to the separated nitrogen in the air separation plant 5.

A waste heat boiler 26 is connected to the exhaust gas line 25 of the gas turbine 18. The steam line 27 of the waste heat boiler is connected to the steam turbine 28 of the steam power generating plant part 3. In the embodiment example, the steam turbine consists of a high-pressure part 29 and a low-pressure part 30. It is coupled to a generator 31. The low pressure part of the steam turbine 28 is followed by a condenser 32 which condenses the exhaust steam from low-pressure part 30, a condensate pump 33, a feedwater tank 34 for collecting the condensate and various feedwater pumps 35, 36, for directing feedwater to a desired point in the plant.

Coal and oxygen from the preceding air separation plant is fed to the coal gasifier 6. In addition, process steam is fed into the coal gasifier. The coal is gasified by means of the oxygen and the process steam to form raw gas containing substantial amounts of carbon monoxide and hydrogen. This raw gas is cooled in the heat exchanger installation 7 which is connected to the coal gasifier 6. The heat extracted from the raw gas in the heat exchangers is used for generating steam. Thereafter, the raw gas is freed of suspended dust particles in the gas dust collecting plant 8 by means of water. In the process, the raw gas is saturated with water vapor. The raw gas thus purified is conducted, depending on the mode of operation of the power station, to different parts to the combustion chamber 21 of the gas turbine 18 and to the further processing stages within the plant 3 for manufacturing chemical raw materials. The gasification of coal to form raw gas containing substantial amounts of carbon monoxide and oxygen is known in the art.

The raw gas from plant 4 for producing chemical raw materials, is conducted to a converting plant 9. There, the carbon monoxide contained in the raw gas is reacted with water to form hydrogen and carbon dioxide. The carbon dioxide and the hydrogen sulfide in the resultant gas are removed in the subsequent gas purification plant 10 in accordance with technically known methods. The thus purified gas which contains principally hydrogen and, depending on the degree of conversion in converting plant 7, contains carbon monoxide to a greater or lesser degree, is purified in the gas separation plant 11 by removing all other gases with the exception of hydrogen and, at the same time, the hydrogen is enriched with nitrogen from the air separation plant 5. The ratio of hydrogen to nitrogen is about 3:1 at the output of the gas separation plant 11. This synthesis gas is fed to the plant 12 for the ammonia synthesis. The synthesis of ammonia from nitrogen and hydrogen is known in the art. There, the synthesis gas is first compressed by a gas compressor 13 to the process pressure and then fed into the ammonia synthesis reactor 14. The ammonia-containing gases which leave the ammonia synthesis reactor and are not converted completely, are cooled in a following gas separator 15. Ammonia is condensed and collects in the bottom of vessel 15 from which it is discharged. The exhaust gases above the liquid condensate in vessel 15 are returned by compressor 17 to the ammonia synthesis reactor 14 through the recirculating line 16. To prevent "build-up" of the reaction gases, part of the recirculated exhaust gases are removed, i.e. purged. This purge gas having non-reactable gas components are fed into the fuel gas line 22 and together with raw gas are burned in the combustion chamber 21 of the gas turbine 18. The residual start gases of the gas separation plant 11 and the gas purification plant 10 are also fed into the fuel gas line and burned together with the raw gas. The hot exhaust gases of the gas turbine 18 are conducted through the waste heat boiler 26 and there give off the major part of its heat. Live steam is generated in the waste heat boiler from the water supplied by the feedwater pump 35. This steam, together with the steam supplied in the heat exchanger installation 7, is fed to the steam turbine 28. The process steam, which is required for the operation of the coal gasifier and for various reaction stages, is taken from the pressure stages of the steam turbine 28. The steam exhausted in low pressure part 30 of the steam turbine 28 is condensed in the condenser 32 and the condensate pumped as feedwater by the condensate pump 33 to the feedwater tank 34. If coal with a high sulfur content is used, it is advisable to build the gas scrubber plant 23 into the fuel gas line 22 leading from the gas dust collecting plant 8 to the combustion chamber 21 of the gas turbine, in order that the exhaust gases of the gas turbine are below the permissible emission values for sulfur. For this purpose, a simple plant in which the hydrogen sulfide is washed out with a suitable solvent is sufficient.

In the case of coal with a high sulfur content, it can also be advantageous to feed the cooled-down raw gas leaving the dust separator 8, partially bypassing the conversion plant 9 ahead of the gas purification plant 10 and the gas separation plant 11. This results in substantially more carbon monoxide and less hydrogen being produced from the gas separation plant 11. Thus, more sulfur-free carbon monoxide containing gas can be fed to the combustion chamber 21. In exchange, less synthesis gas is available for the plant 12 for the synthesis of ammonia. In this regard, it is noted that the expense for conversion of carbon monoxide to hydrogen is reduced and this conversion can even be omitted entirely. As a consequence of the partial or total bypassing of conversion plant 9, there results also a smaller loss of combustible gases. Finally, the expenditure for the removal of $CO_2$ and gas separation (gas separation plant 11) becomes smaller. These gases are fed with the exhaust gas of the ammonia synthesis to the combustion chamber 21 of the gas turbine 18 and their energy content therefore does not get lost. The nitrogen oxide emission in the exhaust gas of the gas turbine may be lowered by admixing nitrogen from the air separation plant 5 to the fuel gas in the fuel gas line leading to the combustion chamber of the gas turbine.

The foregoing is a description corresponding, in substance, to German application No. P 33 20 228.1, dated June 3, 1983, international priority of which is being claimed for the instant application, and which is hereby made part of this application. Any material discrepancies between the foregoing specification and the specification of the aforementioned corresponding German application are to be resolved in favor of the latter.

We claim:

1. Power generating station with an integrated coal gasification plant and an ammonia synthesis plant comprising
   (a) a coal gasification plant which includes a gasifier for gasification of coal to produce raw fuel gas containing a mixture of gaseous constituents including $H_2$, $CO$, $CO_2$ and $H_2S$,
   (b) a heat exchanger in which the heat of the raw gas from the gasifier is utilized to generate steam,
   (c) a dust removal plant wherein the raw gas is treated to remove dust particles from the raw gas,
   (d) a gas turbine power plant which include a gas turbine, a combustion chamber of the gas turbine, an air compressor for introduction of air into the combustion chamber, and a generator coupled to the turbine,
   (e) a steam generating station which includes a steam generator, and a high pressure and low pressure steam turbine,
   (f) conduit means for the passage of steam from the heat exchanger of the coal gasification to the steam turbine,
   (g) connecting means for passage of part of the raw gas from the dust removal plant to the combustion chamber of the gas turbine,
   (h) a conversion plant for converting part of the carbon monoxide in the raw gas from the dust removal plant into carbon dioxide and hydrogen,
   (i) a subsequent gas purification plant to remove carbon dioxide and hydrogen sulfide impurities from the resultant raw gas from the conversion plant,
   (j) a gas separation plant wherein the gas from the gas purification plant is treated to remove all other gases with the exception of hydrogen and, at the same time the hydrogen is enriched with nitrogen to form synthesis gas containing hydrogen and nitrogen suitable for conversion into ammonia and a separated fraction of residual gases,
   (k) an air separation plant for separation of air into oxygen and nitrogen together with connecting means from the air separation plant to supply the coal gasifier with oxygen and the gas separation plant with nitrogen,
   (l) an ammonia synthesis plant for the conversion of the synthesis gas containing hydrogen and nitrogen, having an ammonia synthesis reactor and separating means for separating ammonia from the residual gases in the reaction products from the synthesis reactor,
   (m) connecting means for conduction of said synthesis gas into the ammonia synthesis reactor, and
   (n) conduit means for passage of part of the residual gases in the reaction products from the ammonia synthesis reactor together with the separated fraction of residual gases in the gas purification plant to the combustion chamber of the gas turbine.

2. Power generating station according to claim 1, including a line conducting gases containing nitrogen from the air separation plant connected to a fuel gas line leading to the combustion chamber of the gas turbine.

3. Power generating station according to claim 1, including a second gas purification plant interposed in said connecting means for passage of part of the raw gas from the dust removal plant directly via the second gas purification plant to the combustion chamber of the gas turbine.

4. Power generating station according to claim 3, wherein said second gas purification plant is a gas scrubber for removal of hydrogen sulfide from the raw gas.

* * * * *